United States Patent Office 3,506,694
Patented Apr. 14, 1970

3,506,694
17-ACYLOXYSTEROIDS AND THEIR MANUFACTURE
Peter Oxley, Nottingham, England, assignor to Boots Pure Drug Company Limited, Nottingham, England, a British company
No Drawing. Filed Nov. 27, 1967, Ser. No. 685,984
Claims priority, application Great Britain, Dec. 15, 1966, 56,249/66
Int. Cl. C07c 169/34
U.S. Cl. 260—397.45    4 Claims

ABSTRACT OF THE DISCLOSURE

Compounds of the formula

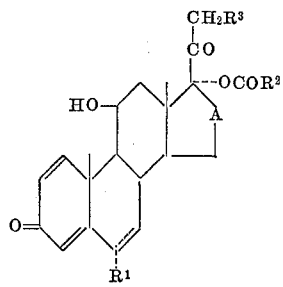

in which the bond marked ==== is selected from the group consisting of single and double bonds; A is selected from the group consisting of

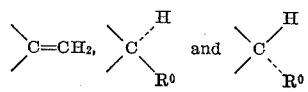

$R^0$ is selected from the group consisting of hydrogen, alkanoyloxy, fluorine, chlorine and methyl; $R^1$ is selected from the group consisting of hydrogen, fluorine, methyl and fluorinated methyl; $R^2$ is alkyl; and $R^3$ is selected from the group consisting of hydrogen, fluorine and chlorine; and their preparation by reducing a compound of the formula

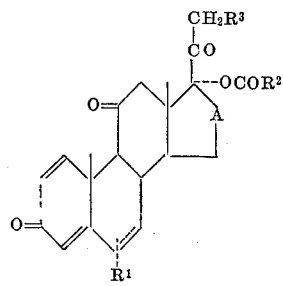

with a reducing agent selected from the group consisting of sodium borohydride, potassium borohydride and lithium trialkoxy-aluminum hydrides of the formula $LiAl(OR^4)_3H$, wherein $R^4$ is alkyl.

---

This invention relates to a process for preparing 17-acyloxy steroids. More particularly it relates to the preparation of 17α-acyloxy-1,2-dihydro-11β-hydroxyprogesterones, their 21-halo derivatives and their Δ⁶-analogues.

It is not possible to prepare 17α-acyloxy-11β-hydroxyprogesterones and their 21-halo derivatives by direct selective acylation of 11β,17α diols because of the similar reactivity of the 11β- and 17α-hydroxyl groups. It is also impossible to prepare them by selective hydrolysis of 11β,17α diesters. Such compounds must therefore be made by indirect methods.

The present invention is based on our discovery that the 11-keto groups of 17α-acyloxy-3,11,20-triketopregna-1,4-dienes may be reduced to 11β-hydroxyl groups without simultaneous reduction of the 3- or 20-keto groups, the 17-ester group or the double bonds when particular reducing agents are chosen.

According to the present invention there is provided a process for preparing a compound of the general formula

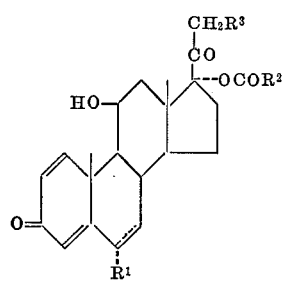

where the bond marked ==== may be either a single or a double bond; A represents the groups

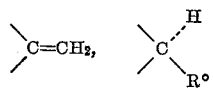

or

where $R^0$ is hydrogen, alkanoyloxy, fluorine, chlorine or methyl; $R^1$ is hydrogen, fluorine or methyl optionally substituted by one or more fluorine atoms, $R^2$ is alkyl, and $R^3$ is hydrogen, fluorine or chlorine characterised by reducing a compound of general formula

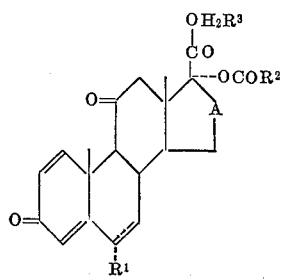

where the symbols ====, A, $R^1$, $R^2$ and $R^3$ are as hereinbefore defined with sodium or potassium borohydride or a lithium trialkoxyaluminum hydride of general formula $LiAl(OR^4)_3H$, where $R^4$ is alkyl, preferably having 1–4 carbon atoms.

There are also provided novel intermediates of general Formula III

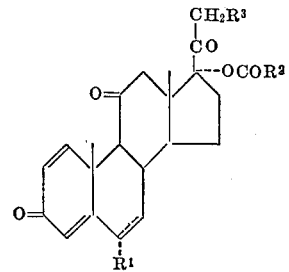

where the symbols ====, $R^1$, $R^2$ and $R^3$ are as hereinbefore defined.

For convenience compounds of Formula I are referred to as 21-desoxy-prednisolones when $R^3$ is H, and to prednisolone 21-halides when $R^3$ is halogen. Similarly compounds of Formula II are referred to as 21-desoxy-prednisones and prednisone 21-halides.

When borohydrides are used as reducing agents, the reaction may be carried out in water, alkanols or in dimethylformamide. Reduction by lithium trialkoxyaluminum hydrides is performed in an inert solvent, preferably an ethereal solvent such as diethyl ether, diglyme or tetrahydrofuran at room temperature and is usually complete in a few minutes. A particularly preferred solvent is tetrahydrofuran. The preferred reducing agent is lithium tri(t-butoxy)-aluminum hydride which is easily prepared from lithium aluminum hydride and t-butanol.

The starting materials of general Formula II are known or may be prepared by conventional acylation of the corresponding 17α-hydroxy compounds.

The 11-keto compounds which are acylated to give compounds of general Formula II are readily prepared by oxidation of an 11α- or 11β-hydroxy steroid or a mixture thereof. These compounds may be prepared by known methods, for example by reaction of a $\Delta^{9(11)}$ steroid with hypobromous acid followed by reduction of the resultant 9α-bromo steroid. Alternatively the 11-oxygenated function may be introduced microbiologically using a number of organisms including Rhizopus, Cunninghamella blakesleeana, Aspergillus ochraceus, Absidia spp. and Curvularia spp. The readily available steroid progesterone may be hydroxylated in the 11α and 17α positions simultaneously by fermentation with Cephalothecium roseum.

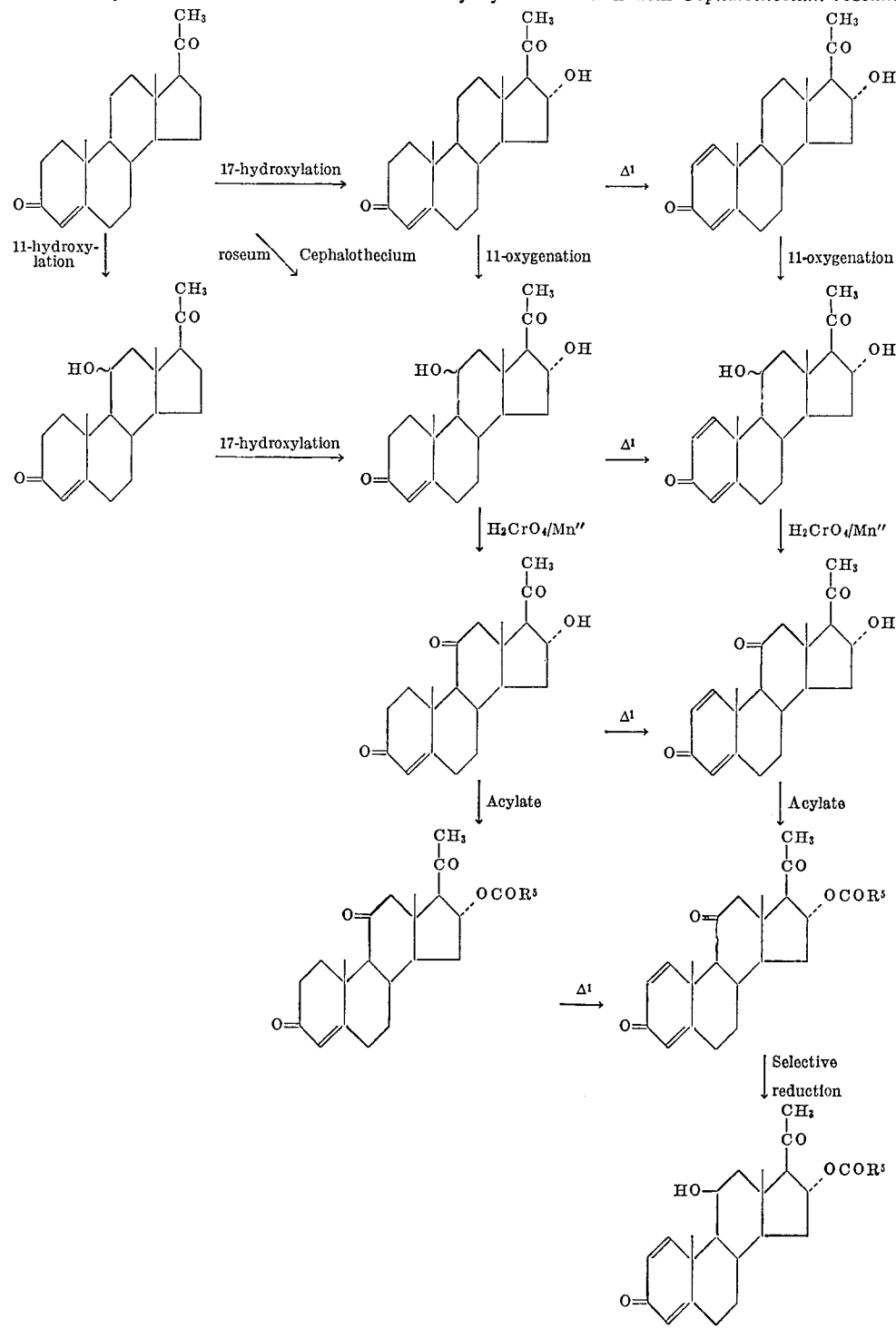

The oxidation of 11-hydroxy steroids to the corresponding 11-keto steroids requires an oxidising agent which will not attack the $C_{17}$ side chain. Suitable agents are chromium trioxide in the presence of pyridine or chromic acid in the presence of manganous ions.

The preceding reaction scheme illustrates a typical series of reactions starting from 17α-hydroxyprogesterone or from progesterone to give 21-desoxyprednisolone 17α-esters. The symbol $R^2$ is as defined in general Formula I above. Introduction of the $\Delta^1$-double bonds may be by known chemical or microbiological techniques. Similar reactions may be performed in the 21-halo series compounds.

PREPARATION 1

21-desoxyprednisolone (10 g.) was suspended in glacial acetic acid (100 ml.) containing 50% manganous nitrate solution (20 ml.). The mixture was stirred at 10–15° C. during the dropwise addition of chromium trioxide (4 g.) in water (6 ml.) and concentrated nitric acid (8 ml.). After stirring for 30 minutes 5% aqueous sodium bisulphite (200 ml.) was added to give a precipitate of 21-desoxyprednisone, M.P. 247–248° C. (dec.) which was homogeneous on thin layer chromatograms.

PREPARATION 2

21-desoxyprednisone (1 g.) was added to a solution of p-toluenesulphonic acid (0.1 g.) in acetic anhydride (4 ml.). The mixture was warmed to 70° C. for 5 minutes until homogeneous and then left to stand overnight at room temperature. The solution was poured into dilute ammonium hydroxide and stirred to decompose the excess anhydride. The precipitated solid was collected, washed with water, dried and recrystallised from methanol to give 21-desoxyprednisone 17α-acetate, M.P. 198–199°, $[\alpha]_D$ +116.6° (chloroform).

With minor modifications to the temperature and time of reaction, the following 17α-esters were prepared similarly:

21 - desoxyprednisone 17α - butyrate, M.P. 210–211° C., $[\alpha]_D$ +105° (chloroform)
21 - desoxyprednisone 17α - isobutyrate, M.P. 190–191° C., $[\alpha]_D$ +104.8° (chloroform)
21-desoxyprednisone 17α-propionate, having two crystalline forms (i) M.P. 198–200° C., (ii) 185–186° C., $[\alpha]_D$ +108° (chloroform).

The following non-limitative examples illustrate the invention:

Example 1

21-desoxyprednisone 17α-propionate (1 g.) was dissolved in dimethylformamide (9.5 ml.) containing water (0.5 ml.) and potassium borohydride (100 mg.) was added. After standing at room temperature for 6 hours the mixture was diluted with water, acidified with acetic acid and extracted with benzene. The extract was washed with water, evaporated to dryness and the residue was purified by preparative layer chromatography to give 21-desoxyprednisolone 17α-propionate, M.P. 227–229° C.

Example 2

Potassium borohydride (75 mg.) was added to a solution of 21-desoxyprednisone 17α-isobutyrate (300 mg.) in dimethylformamide, the mixture was shaken until the hydride had dissolved and, after leaving to stand for 21 hours at room temperature, the mixture was poured into water. The solid was collected, purified by preparative layer chromatography and crystallised from ether to give 21-desoxyprednisolone 17α-isobutyrate, M.P. 220–221° C.

When a similar reaction was performed using aqueous dimethylformamide as the reaction medium, the reduction of the 11-keto groups went more rapidly but there was a slight increase in the amount of by-products as indicated by thin-layer chromatography.

Example 3

Lithium aluminium hydride (0.5 g.) suspended in dry tetrahydrofuran (20 ml.) was cooled in ice-water and t-butanol (4 ml.) was slowly added. The mixture containing lithium tri(t-butoxy) aluminium hydride was filtered with kieselguhr to remove small particles and 21-desoxyprednisone 17α-propionate (1 g.) was added to the filtrate. On shaking, the solid dissolved in 1 minute and reduction was complete in 5 minutes. The reaction mixture was poured into ice N/5 hydrochloric acid. The solid which separated was collected and crystallised from isopropanol to give 21-desoxyprednisolone 17α-propionate, M.P. 227–229° C. which was virtually homogeneous on thin layer chromatograms.

Example 4

Lithium tri(t-butoxy) aluminium hydride was prepared from lithium aluminium hydride (0.3 g.) in tetrahydrofuran (13 ml.) and t-butanol (2.4 ml.). To the filtered solution there was added 21-desoxyprednisone 17α-acetate (0.6 g.) which dissolved immediately. The solution was left to stand at room temperature for 10 minutes, poured into water (130 ml.) containing concentrated hydrochloric acid (3 ml.). The solid which separated was collected, washed with water and recrystallised from methanol to give 21-desoxyprednisolone 17α-acetate, M.P. 262–264° C., which thin layer chromatography showed to be homogeneous.

Example 5

21-desoxyprednisone 17α-butyrate (1.25 g.) was added to a solution of lithium tri(t-butoxy) aluminium hydride prepared from lithium aluminium hydride (0.6 g.), dry tetrahydrofuran (26 ml.) and t-butanol (4.8 ml.). The clear solution was left to stand for 10 minutes at room temperature and then poured into water (300 ml.) containing concentrated hydrochloric acid (6 ml.). The solid which separated was collected, dissolved in methylene chloride, the solution was concentrated and ether was added. The mixture was distilled until the remaining methylene chloride was removed. The concentrate crystallised on standing to give 21-desoxyprednisolone 17α-butyrate, M.P. 228–232° C.

Example 6

A solution of prednisolone 21-chloride 17α-propionate (439 mg.) in acetone (20 ml.) was titrated with Jones reagent, using 0.31 ml. The mixture was poured into water, extracted with methylene chloride and the extract was evaporated. The residual gum was purified by preparative layer chromatography and crystallised from acetone/ether/hexane to give prednisone 21-chloride 17α-propionate, M.P. 97–100° C., $[\alpha]_D^{21}$+110° (chloroform).

This compound (50 mg.) was added to lithium tri (t-butoxy) aluminium hydride prepared from lithium aluminium hydride, tetrahydrofuran (4 ml.) and t-butanol (0.8 ml.) and after 10 minutes the mixture was poured into N/10 hydrochloric acid (50 ml.). The steroid was isolated in methylene chloride and purified by preparative layer chromatography to give prednisolone 21-chloride 17α-propionate which was identical with an authentic sample.

Example 7

A fermentation medium was prepared containing the following ingredients:

Cornsteep liquor (60% solids)—2% v./v.
Glucose monohydrate—1% w./v.
Tap water—to 100 percent
pH 4.8 before sterilisation.

Sterile medium in shake flasks was inoculated with a vegetative inoculum of Rhixopus nigricans and incubated for 24 hours at 29° C. A sterile solution of 17α-hydroxyprogesterone in dimethylacetamide was added to give a substrate level of 300 γ/ml. The fermentation was continued for a further 72 hours at 29° C. The whole brew was extracted with ethyl acetate (½ vol.), the solvent phase was washed with dilute sodium bicarbonate solution then water, dried and evaporated. The residue was purified by preparative layer chromatography and crystallised from ether to give 11α,17α-dihydroxyprogesterone.

A solution of 11α,17α - dihydroxyprogesterone (100 mg.) in glacial acetic acid (2 ml.) was cooled at 10° C. and 50% manganous nitrate (0.2 ml.) was added. A solution of chromium trioxide (40 mg.) in water (0.06 ml.) and concentrated nitric acid (0.08 ml.) was added dropwise and the solution was kept at 10° C. for 30 minutes. The excess chromium trioxide was destroyed by the addition of 5% sodium bisulphite solution (4 ml.) and a crystalline solid gradually separated on standing. The solid was collected, washed, dried and purified by preparative layer chromatography to give 21 - desoxycortisone, M.P. 236–238° C., $[\alpha]_D+198°$ (chloroform) which was identical with authentic material.

In a similar way, 11β,17α-dihydroxyprogesterone prepared by microbiological oxidation of 17α - hydroxyprogesterone with enzymes from a growing culture of *Curvularia prasadii* was converted into 21 - desoxycortisone, M.P. 236–238° C., $[\alpha]_D+197°$ (chloroform) identical with authentic material.

21-desoxycortisone was treated with 2,3-dichloro-5,6-dicyanobenzoquinone to give 21-desoxyprednisone identical with that prepared by the method described in Preparation 1. This compound was converted into 21-desoxyprednisone 17α-propionate by the method described in Preparation 2, the 21-desoxyprednisone 17α-propionate being finally reduced to 21-desoxyprednisolone 17α-propionate by the method described in Example 4.

Example 8

By methods similar to those described in Examples 1–7, there are prepared compounds of general Formula I in which

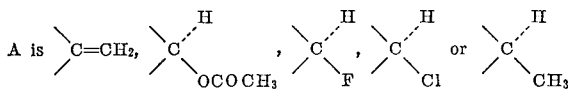

(and the corresponding α-compounds), $R^1$ is fluorine, methyl or fluorinated methyl, and $R^3$ is fluorine, by reduction of the appropriate 11-keto compounds.

I claim:
1. A process for preparing compounds of the formula

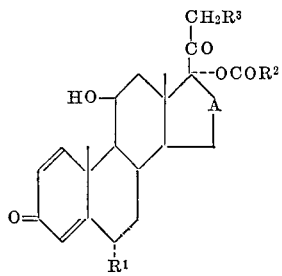

in which the bond marked $=$ is selected from the group consisting of single and double bonds; A is selected from the group consisting of

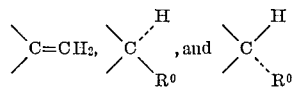

$R^0$ is selected from the group consisting of hydrogen, alkanoyloxy, fluorine, chlorine and methyl; $R^1$ is selected from the group consisting of hydrogen, fluorine, methyl and fluorinated methyl; $R^2$ is lower alkyl; and $R^3$ is selected from the group consisting of hydrogen, fluorine and chlorine; which comprises reducing a compound of the general formula

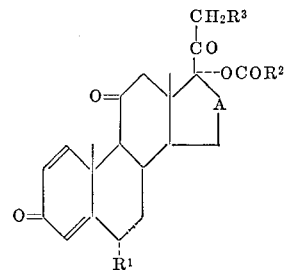

with a reducing agent selected from the group consisting of sodium borohydride, potassium borohydride and lithium trialkoxy - aluminium hydrides of the formula $LiAl(OR^4)_3H$, wherein $R^4$ is alkyl.

2. A process according to claim 1 wherein the reducing agent is lithium tri-(t-butoxy)-aluminium hydride.

3. A process according to claim 1 in which a compound of the formula

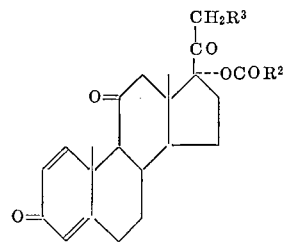

in which $R^2$ is lower alkyl and $R^3$ is selected from the group consisting of hydrogen, fluorine and chlorine, is reduced with a reducing agent selected from the group consisting of sodium borohydride, potassium borohydride and lithium trialkoxyaluminium hydrides of the formula $LiAl(OR^4)_3H$, wherein $R^4$ is alkyl containing 1–4 carbon atoms, to give a compound of the formula

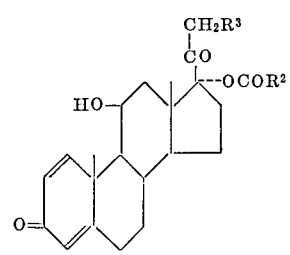

4. A process according to claim 3 wherein 21-desoxyprednisone 17α-propionate is reduced to 21-desoxyprednisolone 17α-propionate.

References Cited

UNITED STATES PATENTS 2,902,410   9/1959   Weintraub et al. _____ 195—51
2,923,721   2/1960   Joly et al. _____ 260—397.3

OTHER REFERENCES

Djerassi—Steroid Reactions (1963) pp. 143 and 145.

HENRY A. FRENCH, Primary Examiner

U.S. Cl. X.R.

195—51; 260—397.4